June 24, 1924.
S. E. DOUGLASS
PLOW ATTACHMENT
Filed April 10, 1922
1,499,158
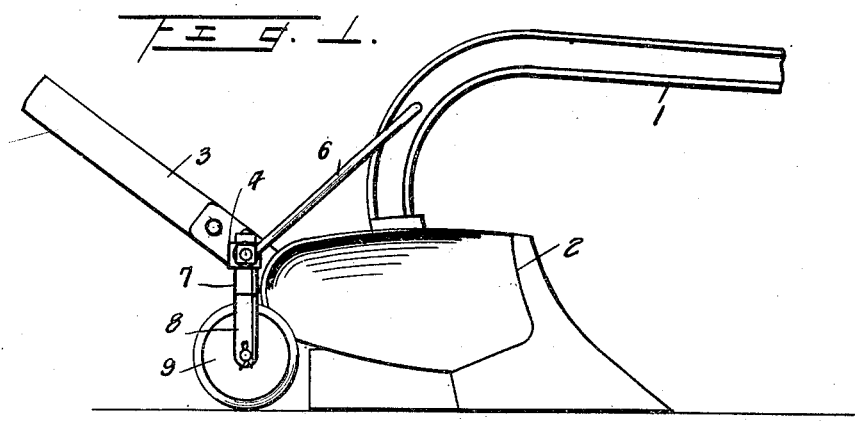
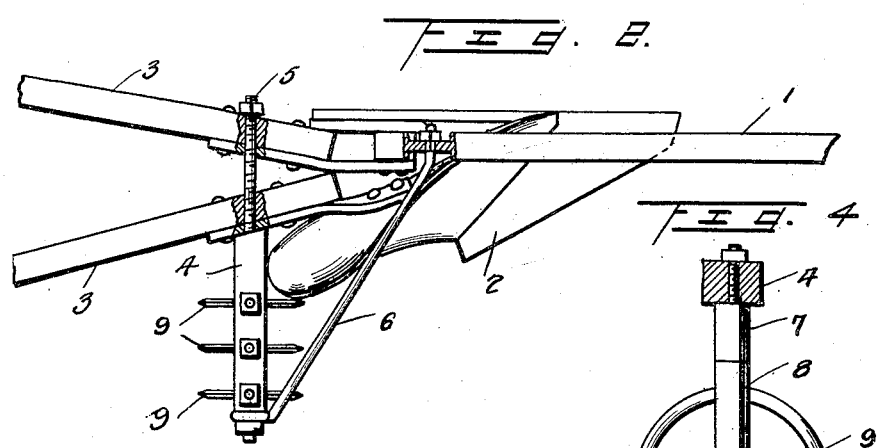
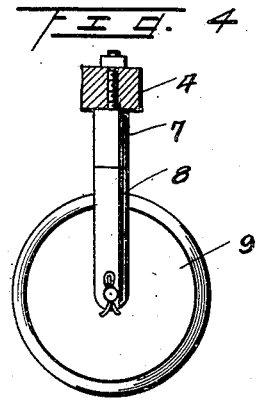
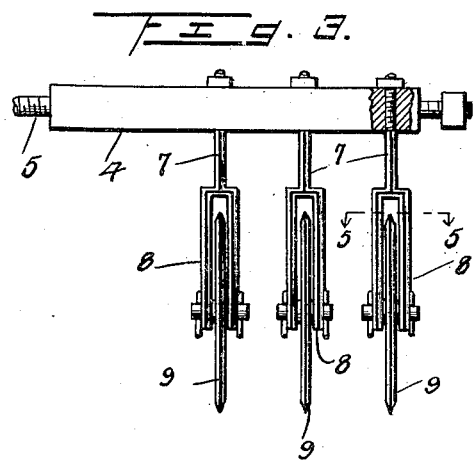
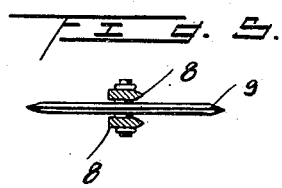
Inventor
S. E. Douglass.
By (signature) Attorney Patented June 24, 1924.

1,499,158

UNITED STATES PATENT OFFICE.

SAMUEL E. DOUGLASS, OF RALEIGH, NORTH CAROLINA.

PLOW ATTACHMENT.

Application filed April 10, 1922. Serial No. 551,095.

*To all whom it may concern:*

Be it known that I, SAMUEL E. DOUGLASS, a citizen of the United States, residing at Raleigh, in the county of Wake and State of North Carolina, have invented certain new and useful Improvements in Plow Attachments; and I do hereby declare the following to be a full, clear, and exact description of the invention, such as will enable others skilled in the art to which it appertains to make and use the same.

This invention relates to agricultural implements and more particularly to an appliance for crushing clods and pulverizing the earth simultaneously with the plowing of the land, the appliance being in the nature of an attachment to be connected to any ordinary shovel plow for turning the soil.

The invention provides an attachment embodying disk cutters which are mounted in forked frames, the furcations of the forks having their front edges sharpened so as to readily penetrate the soil and cut roots, turf and the like.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a shovel plow provided with a clod crushing and earth pulverizing attachment embodying the invention, Figure 2 is a top plan view of the parts illustrated in Figure 1, Figure 3 is a front view of the attachment, Figure 4 is a end view of the attachment, and Figure 5 is a sectional detail on the line 5—5 of Figure 3.

Corresponding and like parts are referred to in the following description and designated in the several views of the drawings by like reference characters.

The plow illustrated is of ordinary construction and is shown to demonstrate the application of the invention and comprises a beam 1, shovel 2 and handles 3.

The attachment comprises a bar 4 which, when in position, projects laterally from the plow away from the land side so as to overhang the furrow. The bar 4 may be attached to the plow in any convenient and substantial way and, as shown, its inner end is reduced, as indicated at 5, and is engaged with the handles 3. A brace 6 is interposed between the outer end of the bar 4 and the beam 1. A plurality of frames are attached to the bar 4 and each of the frames comprises a stem 7 and a fork 8, said frames being attached to the bar 4 by means of the stems 7. The furcations or elements of the fork 8 are sharpened at their front edges, as indicated most clearly in Figure 5, to facilitate their penetration of the soil and the cutting of roots, turf and trash. A disk cutter 9 is mounted in the fork of each of the frames and in the operation of the attachment breaks up clods and materially assists in pulverizing the soil simultaneously with the action of plowing, thereby materially assisting in preparing the land for sowing seed. It is to be understood that the bar 4 may be of any length and the same may be supplied with any number of earth cutting elements. It is observed that the furrow is turned and the soil broken up and pulverized at practically one operation, thereby obviating the necessity of subsequent harrowing and reducing the cost of preparing the land for planting to the smallest amount possible.

What is claimed is:

1. In combination with a plow, a supporting bar having a reduced screw threaded shank passing through the plow handle adjacent the point of their connection with the plow, a shoulder formed at the point of connection between the shank and the body of said bar, said shoulder abutting one of the handles, a nut turned on the free end of the shank and serving to draw the shoulder into engagement with the handle, said supporting bar extending laterally from the handles and in rear of the plow blade, a plurality of forks having shanks secured to said bar, disk cutters rotatably mounted by said forks, and a brace secured to the outer end of the supporting bar and to the plow beam in advance of the supporting bar, said disk cutters being arranged to pulverize the soil as the same is turned by the plow.

2. A soil pulverizing attachment for plows, the same comprising a supporting bar having a reduced screw threaded shank adapted to pass through and be secured to the handles of the plow in the rear of the plow blade, said bar adapted to extend laterally from the plow, a plurality of forks secured to said bar and extending downwardly therefrom, disk cutters rotatably mounted by said forks, the longitudinal edges of said forks being sharpened, a brace member having angularly disposed end portions, one of said end portions forming an eye, said eye adapted to be detachably secured to that end of the supporting bar opposite to the end at which the reduced shank is formed, and the other angularly disposed portion of said brace bar adapted to be detachably secured to a plow beam.

In testimony whereof I affix my signature in presence of two witnesses.

SAMUEL E. DOUGLASS.

Witnesses:
CLYDE A. DOUGLASS,
J. R. LOWERY.